United States Patent
Matsumoto

(10) Patent No.: US 9,904,104 B2
(45) Date of Patent: Feb. 27, 2018

(54) LIGHT SOURCE DEVICE AND DISPLAY APPARATUS

(71) Applicant: Sakai Display Products Corporation, Sakai-shi, Osaka (JP)

(72) Inventor: Kouji Matsumoto, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 0 days.

(21) Appl. No.: 15/300,462

(22) PCT Filed: Jul. 7, 2014

(86) PCT No.: PCT/JP2014/068058
§ 371 (c)(1),
(2) Date: Sep. 29, 2016

(87) PCT Pub. No.: WO2016/006025
PCT Pub. Date: Jan. 14, 2016

(65) Prior Publication Data
US 2017/0153500 A1 Jun. 1, 2017

(51) Int. Cl.
*G02F 1/1335* (2006.01)
*F21V 7/05* (2006.01)
(Continued)

(52) U.S. Cl.
CPC .......... *G02F 1/133605* (2013.01); *F21V 3/00* (2013.01); *F21V 7/05* (2013.01);
(Continued)

(58) Field of Classification Search
CPC ......... G02F 1/133605; G02F 1/133603; G02F 1/133606; G02F 1/133611;
(Continued)

(56) References Cited

U.S. PATENT DOCUMENTS 8,830,422 B2 * 9/2014 Nakamura ........... G02B 6/0055
349/65
2012/0063133 A1 * 3/2012 Takeuchi ........... G02F 1/133603
362/235
(Continued)

FOREIGN PATENT DOCUMENTS

| JP | 2013-118055 A | 6/2013 |
| JP | 2013-118117 A | 6/2013 |
| WO | WO2011152134 A1 | 12/2011 |

OTHER PUBLICATIONS

Translation of JP 2013-118117 A; Jun. 13, 2013.*
Translation of JP 2013 118055 A Jun. 13, 2013.*

*Primary Examiner* — Laura Tso
(74) *Attorney, Agent, or Firm* — Rudy J. Ng; Bret E. Field; Bozicevic, Field & Francis LLP

(57) ABSTRACT

The present invention provides a light source device which includes light emitting elements mounted on one surface of a substrate, and a reflection sheet provided on the one surface of the substrate to reflect light from the light emitting elements toward a region opposed to the one surface, prevents the reflection sheet from floating from the one surface of the substrate, and reduces regions lacking the reflection sheet in the vicinity of the diffusion parts, as well as, suppress an occurrence of luminance unevenness caused by the floating of the reflection sheet and the lacking of the reflection sheet, and a display apparatus including the light source device. The light source device includes a diffusion part which are provided proximal to a light emission surface of the light emitting element to diffuse the light from the light emitting element, and the reflection sheet is configured so as to have through holes including a part in which a distance between two opposite points in edge thereof is not more than a size of the diffusion part in a view along a vertical direction to the one surface, and the through hole is
(Continued)

formed at a position matching with that of the diffusion part in a view along the vertical direction to the one surface.

20 Claims, 10 Drawing Sheets

(51) Int. Cl.
*F21V 3/00* (2015.01)
*F21V 13/02* (2006.01)
*F21Y 115/10* (2016.01)

(52) U.S. Cl.
CPC ........ *F21V 13/02* (2013.01); *G02F 1/133603* (2013.01); *G02F 1/133606* (2013.01); *G02F 1/133611* (2013.01); *F21Y 2115/10* (2016.08); *G02F 1/133608* (2013.01); *G02F 2001/133607* (2013.01)

(58) Field of Classification Search
CPC ... G02F 1/133608; G02F 2001/133607; F21V 3/00; F21V 7/05; F21V 13/02; F21V 7/0066; F21V 7/16; F21Y 2115/10
USPC ............ 362/97.2, 247, 249.02, 311.02
See application file for complete search history.

(56) References Cited

U.S. PATENT DOCUMENTS

| 2012/0063150 A1* | 3/2012 | Takeuchi | G09F 9/33 362/308 |
| 2013/0050589 A1 | 2/2013 | Kamada | |
| 2016/0018698 A1* | 1/2016 | Su | G02F 1/133605 362/97.2 |

* cited by examiner

F I G. 5
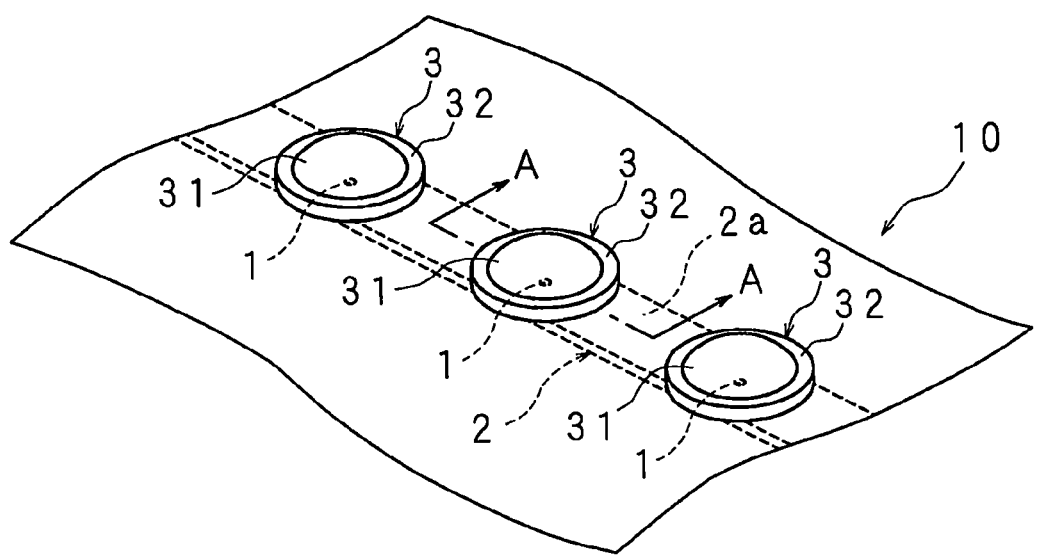

LIGHT SOURCE DEVICE AND DISPLAY APPARATUS

This application is the national phase under 35 U.S.C. § 371 of PCT International Application No. PCT/JP2014/068058 which has an International filing date of Jul. 7, 2014 and designated the United States of America.

BACKGROUND

Technical Field

The present invention relates to a light source device which includes light emitting elements mounted on one surface of a substrate, and a reflection sheet provided on the one surface of the substrate to reflect light from the light emitting elements, and a display apparatus including the light source device.

Description of Related Art

Liquid crystal display apparatuses (display apparatuses) are generally equipped with a backlight device for irradiating a display panel with light. As such the backlight device, a so-called direct type backlight device which includes a plurality of LEDs, and a reflection sheet for reflecting light emitted from the LEDs to the display panel side has been known in the art.

Meanwhile, International Publication No. 2011/152134 discloses a direct type lighting device which includes an LED substrate, LED light sources disposed on a surface of the LED substrate, and a reflection sheet which is disposed proximal to the surface of the LED substrate and has through holes, wherein the LED light sources penetrate the through holes of the reflection sheet, and the reflection sheet is configured in such a manner that a part of an edge part of the through hole is disposed between a light emission surface of the LED light source and the LED substrate, thereby it is possible to prevent and suppress the reflection sheet from floating.

However, the lighting device according to International Publication No. 2011/152134 has a configuration in which the through hole is larger than the light emission surface of the LED light source, and a part of the edge part of the through hole is disposed between the light emission surface of the LED light source and the LED substrate.

That is, the lighting device according to International Publication No. 2011/152134 has a configuration in which a position of the through hole does not match with that of the light emission surface of the LED light sources and is shifted in a thickness direction of the LED substrate, and a number of regions lacking the reflection sheet are present in the vicinity of the light emission surface of the LED light source.

Accordingly, there is a problem in which the light cannot be uniformly reflected in the vicinity of the LED light source, and luminance unevenness occurs.

In consideration of the above-mentioned circumstances, it is an object of the present invention to provide a light source device which includes light emitting elements mounted on one surface of a substrate, and a reflection sheet provided on the one surface to reflect light from the light emitting elements, in which the light source device includes a diffusion part provided proximal to a light emission surface of the light emitting element to diffuse the light from the light emitting element, wherein the reflection sheet has a through hole including a part in which a distance between two opposite points in an edge thereof is not more than a size of the diffusion part in a view along a vertical direction to the one surface, and the through hole in a view along the vertical direction to the one surface is provided at a position matching with a position of the diffusion part, thereby it is possible to prevent the reflection sheet from floating from the one surface of the substrate, and reduce regions lacking the reflection sheet in the vicinity of the diffusion parts, as well as, suppress an occurrence of luminance unevenness caused by the floating of the reflection sheet and the lacking of the reflection sheet, and a display apparatus including the light source device.

According to one embodiment of the present invention, there is provided a light source device which includes light emitting elements mounted on one surface of a substrate, and a reflection sheet provided on the one surface of the substrate to reflect light from the light emitting elements, the light source device comprising: a diffusion part which is provided proximal to a light emission surface of the light emitting elements to diffuse the light from the light emitting element, wherein the reflection sheet has a through hole, the through hole includes a part in which a distance between two opposite points in an edge thereof is not more than a size of the diffusion part in a view along a vertical direction to the one surface, and the through hole is formed at a position matching with a position of the diffusion part in a view along a vertical direction to the one surface.

According to the present invention, the reflection sheet is configured so that the through hole of the reflection sheet has a part of which size is not more than that of the diffusion part in a view along the vertical direction to the one surface. And the through hole, namely, a lacking part of the reflection sheet is prevented from protruding from the outer edge of the diffusion part in a view along the vertical direction to the one surface, such that floating of the reflection sheet from the one surface of the substrate in the vicinity of the through hole may be prevented by the diffusion part, and an occurrence of luminance unevenness caused by the lacking the reflection sheet may be suppressed.

In the light source device according to the embodiment of the present invention, a cut line(s) may be formed at a region around the through hole.

According to the present invention, the cut line is formed at the region around the through hole, to facilitate deformation of the through hole.

In the light source device according to the embodiment of the present invention, the through hole may have a circular shape and it is preferred that the cut lines are formed apart from edge of the through hole in a radial direction of the through hole, and the cut lines may be disposed in line symmetry with respect to the through hole.

According to the present invention, the cut lines are formed apart from the edge of the through hole which has a circular shape, in the radial direction of the through hole, and free deformation of the through hole is limited within a certain degree, thereby it is possible to ensure deformation easiness of the through hole and restorability to an original shape of the through hole.

In the light source device according to the embodiment of the present invention, the through hole may have an elliptical shape, and a size of a long diameter of the through hole may be larger than the maximum size of an outer edge of the diffusion part and a size of a short diameter of the through hole may be smaller than the maximum size of an outer edge of the diffusion part in a view along the vertical direction to the one surface.

According to the present invention, since the size of the short diameter of the through hole is smaller than the maximum size of the outer edge of the diffusion part in a view along the vertical direction to the one surface, a relative movement of the diffusion part to the long diameter direction of the through hole is suppressed.

In the light source device according to the embodiment of the present invention, the cut line may be formed apart from the edge of the through hole and may be formed along the edge of the through hole.

According to the present invention, the cut line is formed apart from the edge of the through hole along the edge, and the free deformation of the through hole is limited within a certain degree, thereby it is possible to ensure deformation easiness of the through holes and restorability to an original shape of the through hole.

In the light source device according to the embodiment of the present invention, a folding line may be formed at the region around the through hole and may be formed along the edge of the through hole.

According to the present invention, since the folding line is formed, the edge part side of the through hole with respect to the folding line is likely to be deformed along the vertical direction to the one surface, such that deformation in the vicinity of the through hole including the through hole may be more easily obtained.

According to one embodiment of the present invention, there is provided a display apparatus which includes the light source device above-mentioned and a display panel configured to display an image using light from the light source device.

According to the present invention, light emitted from the light sources of the light source device is emitted to the display panel, and the display panel displays the image using the light.

According to the present invention, it is possible to prevent the reflection sheet from floating from the one surface of the substrate on which the light emitting elements are mounted, and reduce regions lacking the reflection sheet in the vicinity of the diffusion parts, as well as, suppress an occurrence of luminance unevenness caused by the floating of the reflection sheet and the lacking of the reflection sheet.

The above and further objects and features will move fully be apparent from the following detailed description with accompanying drawings.

BRIEF DESCRIPTION OF THE SEVERAL VIEWS OF THE DRAWINGS

FIG. 5 is a partial perspective view illustrating a configuration of a light source unit of the television receiving apparatus according to Embodiment 1 of the present invention.

DETAILED DESCRIPTION

Hereinafter, an example in which a light source device and a display apparatus according to embodiments of the present invention are applied to a television receiving apparatus will be described in detail with reference to the accompanying drawings.

Embodiment 1

Figure 1:
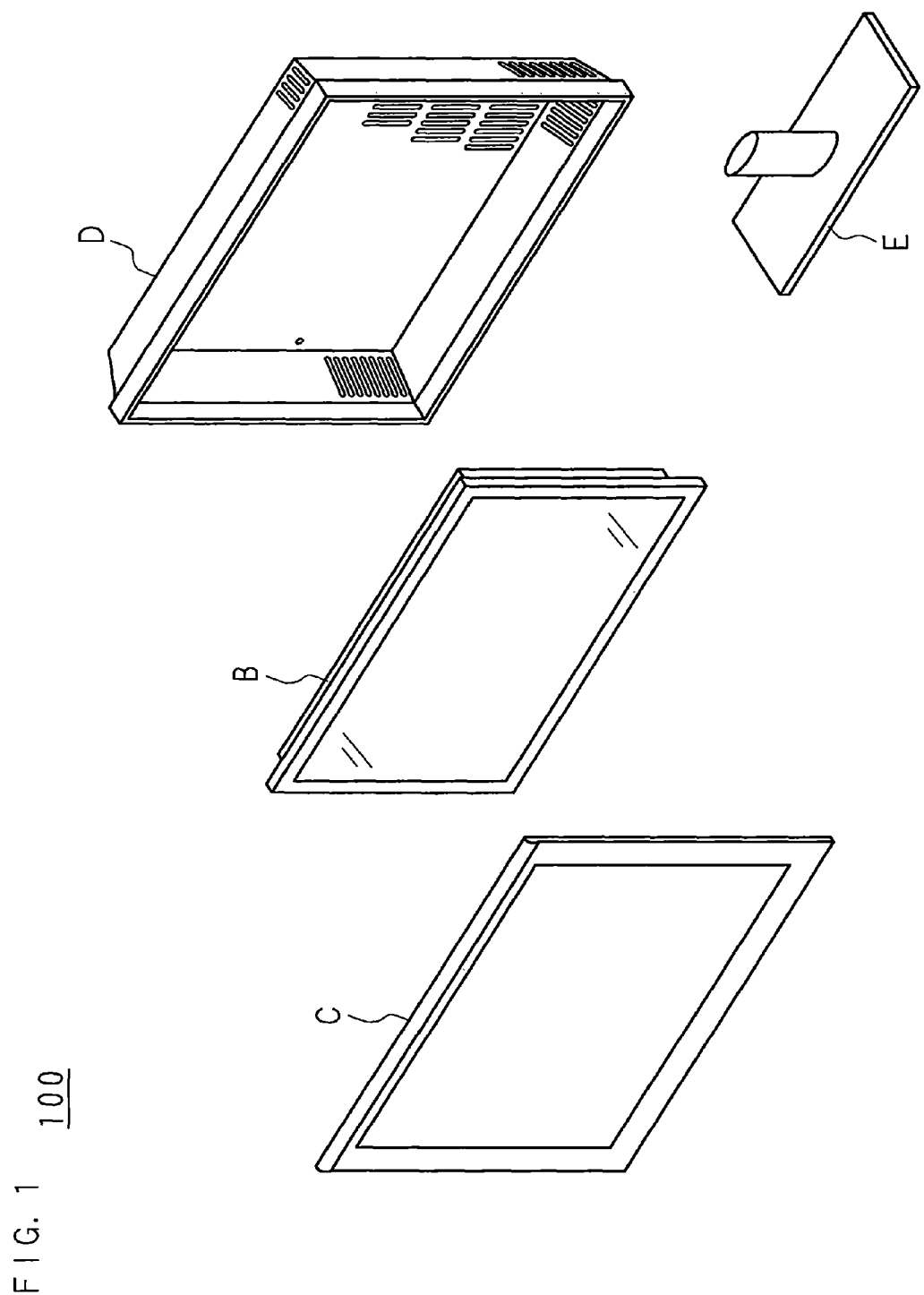
FIG. 1 is an exploded perspective view illustrating a schematic configuration of a television receiving apparatus according to Embodiment 1 of the present invention.
Figure 2:
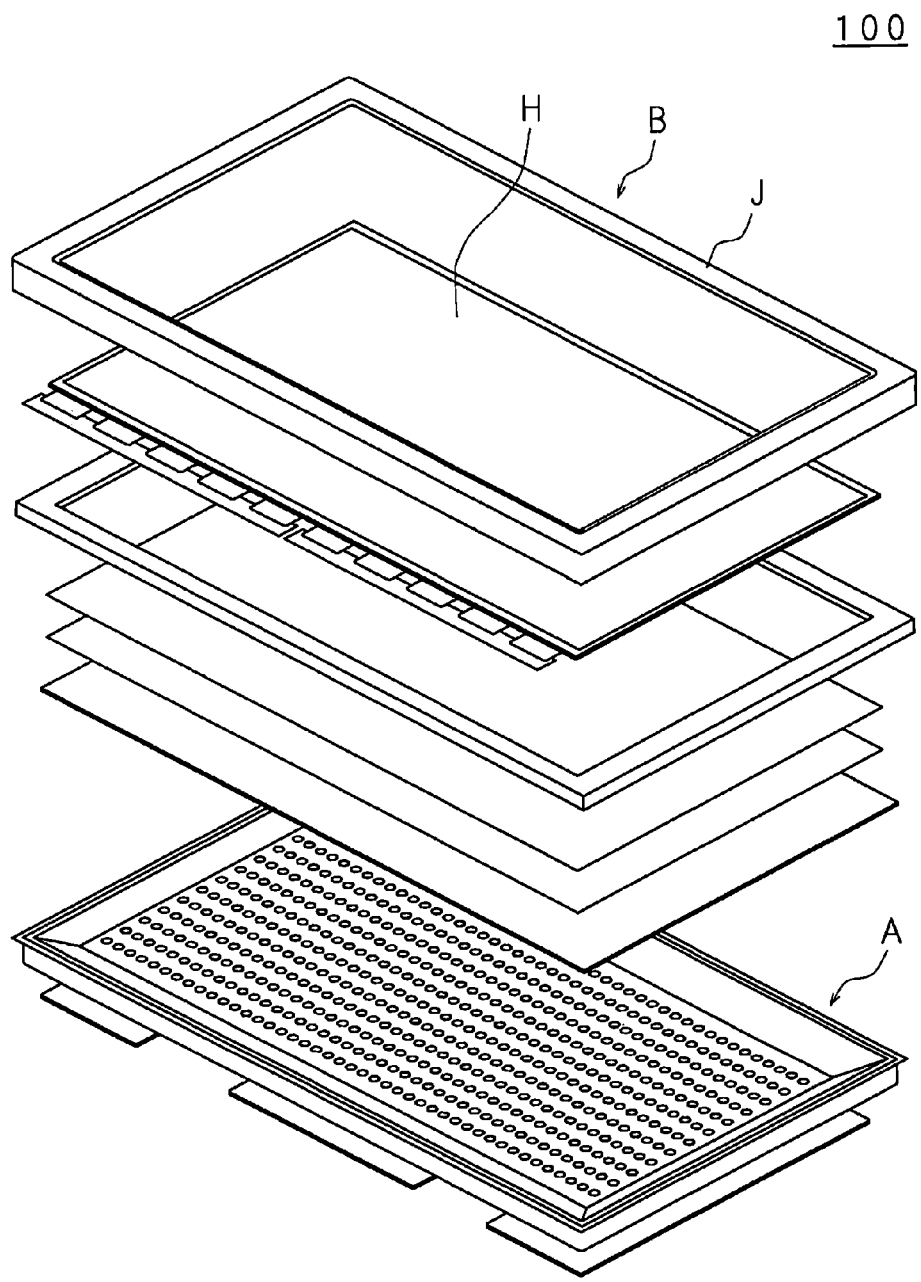
FIG. 2 is an exploded perspective view illustrating main components of the television receiving apparatus according to Embodiment 1 of the present invention.

FIG. 1 is an exploded perspective view illustrating a schematic configuration of a television receiving apparatus according to Embodiment 1 of the present invention, and FIG. 2 is an exploded perspective view illustrating main components of the television receiving apparatus according to Embodiment 1 of the present invention. In the drawings, a television receiving apparatus 100 is illustrated.

The television receiving apparatus 100 includes a liquid crystal display unit B, both front and rear cabinets C and D which house the liquid crystal display unit B so as to sandwich the same therebetween, and a stand E. The liquid crystal display unit B is formed in a laterally long square shape (rectangular shape) as a whole, and is housed in a vertically disposed state. The liquid crystal display unit B includes, as illustrated in FIG. 2, a liquid crystal panel H which is a display panel, and a light source device A, and is configured so that the liquid crystal panel H, a light source device A, and the like are integrally held by a frame-shaped bezel J or the like.

Figure 3:
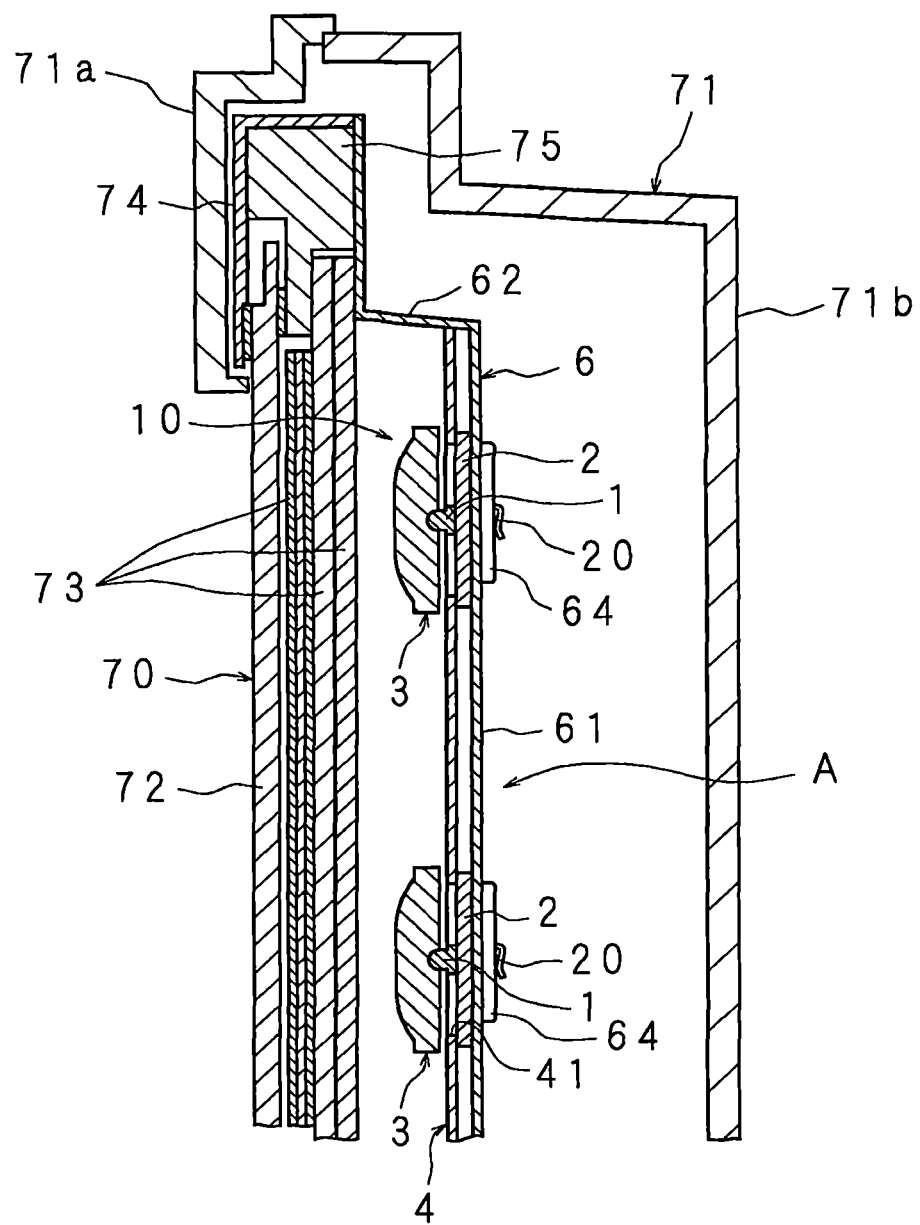
FIG. 3 is a cross-sectional view illustrating the main components of the television receiving apparatus according to Embodiment 1 of the present invention.
Figure 4:
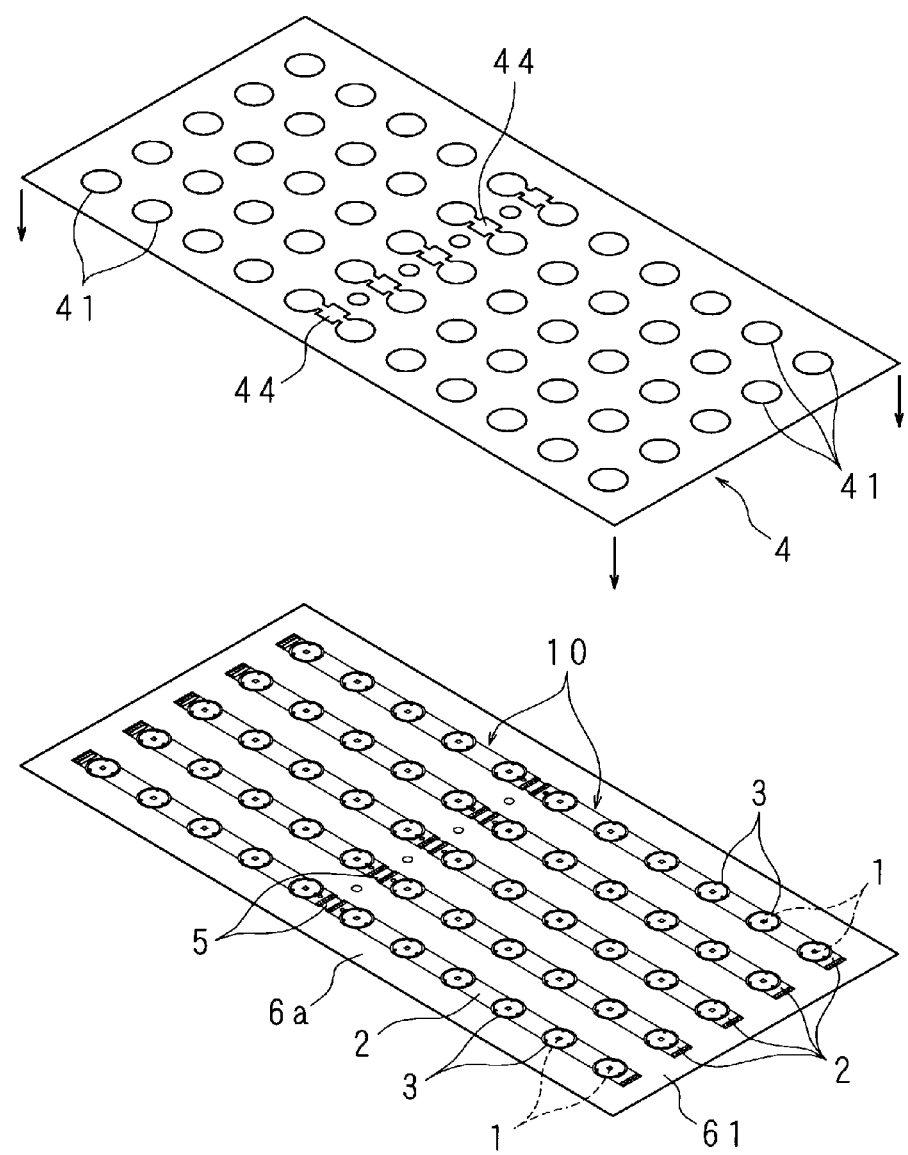
FIG. 4 is a schematic exploded perspective view of a part of a light source device in the television receiving apparatus according to Embodiment 1 of the present invention.
Figure 6:
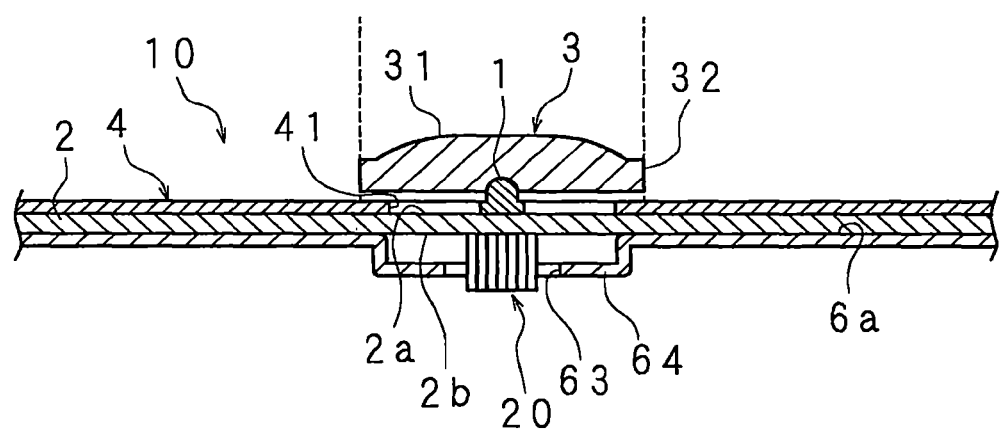
FIG. 6 is a cross-sectional view taken on line A-A of FIG. 5.

FIG. 3 is a cross-sectional view illustrating the main components of the television receiving apparatus 100 according to Embodiment 1 of the present invention, FIG. 4 is a schematic exploded perspective view of a part of a light source device A in the television receiving apparatus 100 according to Embodiment 1 of the present invention, FIG. 5 is a partial perspective view illustrating a configuration of a light source unit of the television receiving apparatus 100 according to Embodiment 1 of the present invention, and FIG. 6 is a cross-sectional view taken on line A-A of FIG. 5.

The television receiving apparatus 100 according to Embodiment 1 of the present invention includes a display part 70 (the liquid crystal panel H) having a display surface for displaying an image on a front side of the display part 70, the light source device A including light source units 10 disposed on a rear side of the display part 70, and a cabinet 71 (C and D) which shields a peripheral edge part of the display part 70 and a rear side of the light source device A.

The display part 70 has a display panel 72 having the display surface, and optical sheets 73 disposed on the rear side of the display panel 72. A peripheral edge part of the display panel 72 is pinched and held by a front holding frame body 74 and a rear holding frame body 75, and the rear holding frame body 75 is attached to a peripheral edge part of a backlight chassis 6 to be described below.

The optical sheet 73 has a configuration in which a relatively thick diffusion plate for diffusing light emitted by the light sources, and a relatively thin synthetic resin sheet such as a reflective polarizing plate, a prism sheet, a diffusion sheet, and the like are laminated together.

The backlight chassis 6 has a plate part 61 and a frame part 62 extending from a peripheral edge of the plate part 61, and a peripheral edge part of the diffusion plate of the optical sheet 73 is supported by the frame part 62.

The cabinet 71 has a cabinet front divided body 71*a* which shields a front side of peripheral edge part of the display part 70, and a deep dish shaped cabinet rear divided body 71*b* which shields a peripheral edge part and rear side of the light source units 10, and is attached to the frame part 62 of the backlight chassis 6 by male screws, for example.

The light source device A according to the present invention includes a plurality of light source units 10. The light source units 10 are provided to the rear side of the display part 70, and include a plurality of light emitting diodes 1 juxtaposed like a grid, a plurality of substrates 2 on which the light emitting diodes 1 are mounted by arranging on one surface 2*a* thereof, the substrates 2 being juxtaposed in a lattice shape, and a plurality of lenses 3 (diffusion parts) which cover a light emission surface of the light emitting diodes 1 from which light is emitted to diffuse the light emitted by the light emitting diodes 1.

In addition, the light source device A includes a reflection sheet 4 which has through holes 41 disposed between the lenses 3 and the one surface 2*a* of the substrates 2, and reflects the light emitted by the light emitting diodes 1 toward the display part 70. Further, the light source device A includes connectors 5 for electrically connecting the light source units 10 with each other, and the backlight chassis 6 for holding the light source units 10. The reflection sheet 4 is placed on the one surface 2*a* of the substrates 2 of the light source units 10.

The light source unit 10 is two types of a unit in which five light emitting diodes 1 are mounted in a line and a unit in which six light emitting diodes 1 are mounted. These units are disposed at a straight line in respective longitudinal directions thereof, and are connected to each other by the connectors 5. The plurality of light source units 10, 10 and ... 10 are attached to the plate part 61 of the backlight chassis 6 to be held thereon.

The substrates 2 are formed in a strip shape as illustrated in FIGS. 4 and 5, and are juxtaposed on one surface 6*a* of the backlight chassis 6 formed in a rectangular shape appropriately apart from each other in a longitudinal direction and a width direction. The substrate 2 has a plurality of light emitting diodes 1 mounted on the one surface 2*a* of the substrate 2 apart from each other at an appropriate interval in the longitudinal direction.

In addition, the substrate 2 has a plurality of hooking parts 20, 20 and ... 20 provided on the other surface 2*b* of the substrate 2 for holding the light source units 10 to the backlight chassis 6 at a plurality of places. The hooking part 20 is made of metal and is elastically deformable.

Meanwhile, the backlight chassis 6 is formed by a metal plate, and has the flat plate-shaped plate part 61 formed in a substantially rectangular shape and the frame part extending from the peripheral edge of the plate part 61. The substrates 2 are arranged in the longitudinal direction and the width direction, and held on the one surface 6*a* of the plate part 61. Further, the backlight chassis 6 also plays a role of a heat dissipation plate that dissipates heat conducted from the light source units 10 to the air.

At places abutting the substrate 2, the plate part 61 is provided with a plurality of locking slits 63 to which the hooking parts 20 of the substrate 2 are locked. The locking slit 63 has a long hole shape in which the longitudinal direction of the plate part 61 is set to a long diameter direction. Further, the shape of the locking slit 63 is not limited to the long hole, and may be a slit shape extending in the longitudinal direction of the plate part 61. The locking slit 63 forms an opening.

In addition, the plate part 61 has recessed parts 64 which have the locking slits 63 and are formed in the one surface 6*a* of the plate part 61. The recessed part 64 is recessed from the one surface 6*a* of the plate part 61 to the opposite side thereof, has the opening on the one surface 6*a*, and is provided with the locking slit 63 on a bottom. The opening of the recessed part 64 and the locking slit 63 are smaller than a size of the other surface 2*b* of the substrates 2 in a width direction thereof, and when the substrate 2 is held to the plate part 61, the opening of the recessed part 64 and the locking slit 63 are covered with the substrate 2.

In the above description, a case of being provided with the recessed part 64 having the locking slit 63 has been described as an example, but it is not limited thereto. A configuration that is provided with only the locking slit 63 while omitting the recessed part 64 may also be employed.

Meanwhile, as illustrated in FIGS. 5 and 6, for example, five or six light emitting diodes 1 are mounted on the substrate 2 apart from each other in the longitudinal direction of the substrate 2, and the lenses 3 are provided corresponding to the respective light emitting diodes 1 on the light emission surface side of the light emitting diodes 1. The lenses 3 are attached to the substrates 2 by an adhesive, for example.

The lens 3 includes a translucent part 31 formed in a half sphere shape for diffusing the light emitted by the light emitting diode 1 in all directions, and a cylindrical circumferential part 32 projecting from a peripheral edge of the translucent part 31 along the one surface 2*a* of the substrate 2.

The circumferential part 32 of the lens 3 is formed in a circular shape in a view along a vertical direction to the one surface 2*a* of the substrates 2 (hereinafter, briefly referred to as the vertical direction), and has a size the same as or slightly larger than the through hole 41 in a view along the vertical direction. In addition, a peripheral edge part of the through hole 41 of the reflection sheet 4 is interposed between the lenses 3 and the one surface 2*a* of the substrates 2. Hereinafter, the edge of the circumferential part 32 in a view along the vertical direction is referred to as an outer edge of the lens 3.

The reflection sheet 4 has high reflecting properties and is made of one synthetic resin sheet formed in a substantially rectangular shape corresponding to the backlight chassis 6, and the through holes 41 is formed at the places corresponding to the 20 respective lenses 3. In addition, second through holes 44 are formed at places corresponding to the respective connectors 5, and the second through hole 44 is formed in a substantially rectangular shape.

The through hole 41 has a shape corresponding to the shape of the lens 3 in a view along the vertical direction. In the present embodiment, the through hole 41 has the circular shape, and has a diameter the same as or slightly smaller than the outer edge of the lens 3. In addition, the through hole 41 is disposed so as to match with the position of the lens 3 in a view along the vertical direction.

In other words, in a view along the vertical direction, the through hole 41 is configured so as to be positioned within the outer edge of the lens 3, and does not protrude from the outer edge of the lens 3.

As described above, in the television receiving apparatus 100 according to Embodiment 1 of the present invention, a size (area) of the through hole 41 of the reflection sheet 4 is the same as or slightly smaller than that of the shape of the lens 3 in a view along the vertical direction (hereinafter, briefly referred to as a shape of the lens 3). Accordingly, when assembling the television receiving apparatus 100 according to Embodiment 1 of the present invention, a worker may push down the reflection sheet 4 toward the substrate 2 after matching the position of the through hole 41 with that of the lens 3. In this case, the through hole 41 appropriately deforms and the lens 3 passes through the through hole 41, thereby the reflection sheet 4 may be laid on the one surface 2a of the substrate 2 (the plate part 61 of the backlight chassis 6).

Since the television receiving apparatus 100 according to Embodiment 1 of the present invention has the above-described configuration, it is possible to prevent the reflection sheet 4 from floating from the one surface 2a of the substrate 2, which will be described in detail below.

When a worker pushes down the reflection sheet 4 toward the substrate 2, the lens 3 passes through the through hole 41, but originally, the size (area) of the through hole 41 is smaller than the area relating to the shape of the lens 3 (see FIG. 6). That is, when the reflection sheet 4 is laid, the edge part relating to the through hole 41 is interposed between the lens 3 and the substrate 2, and is positioned proximal to the light emitting diode 1 in the middle of the lens 3 than the outer edge of the lens 3.

Accordingly, for some reason, even when the reflection sheet 4 is floating from the one surface 2a of the substrate 2, the edge part relating to the through hole 41 is caught by the outer edge of the lens 3, such that the floating of the reflection sheet 4 is suppressed by the lens 3. Thereby, in the television receiving apparatus 100 according to Embodiment 1 of the present invention, it is possible to prevent the reflection sheet 4 from floating by a simple configuration.

In addition, due to having the above-described configuration, when the reflection sheet 4 is laid so that the position of the through hole 41 matches with that of the lens 3 in a view along the vertical direction, the through hole 41 may not protrude from the outer edge of the lens 3 in a view along the vertical direction.

Therefore, all the light emitting through the lenses 3 from the light emitting diode 1 may be reflected to the optical sheet 73 side. In a view along the vertical direction, when (the edge part of) the through hole 41 protrudes from the outer edge of the lens 3, since the protruded portion is lacking the reflection sheet 4, the light may not be reflected, thereby causing luminance unevenness in the display panel 72. However, in the television receiving apparatus 100 according to Embodiment 1 of the present invention, an occurrence of the luminance unevenness in the vicinity of the lenses 3 (light emitting diodes 1) may be prevented as described above.

Embodiment 2

Figure 7:
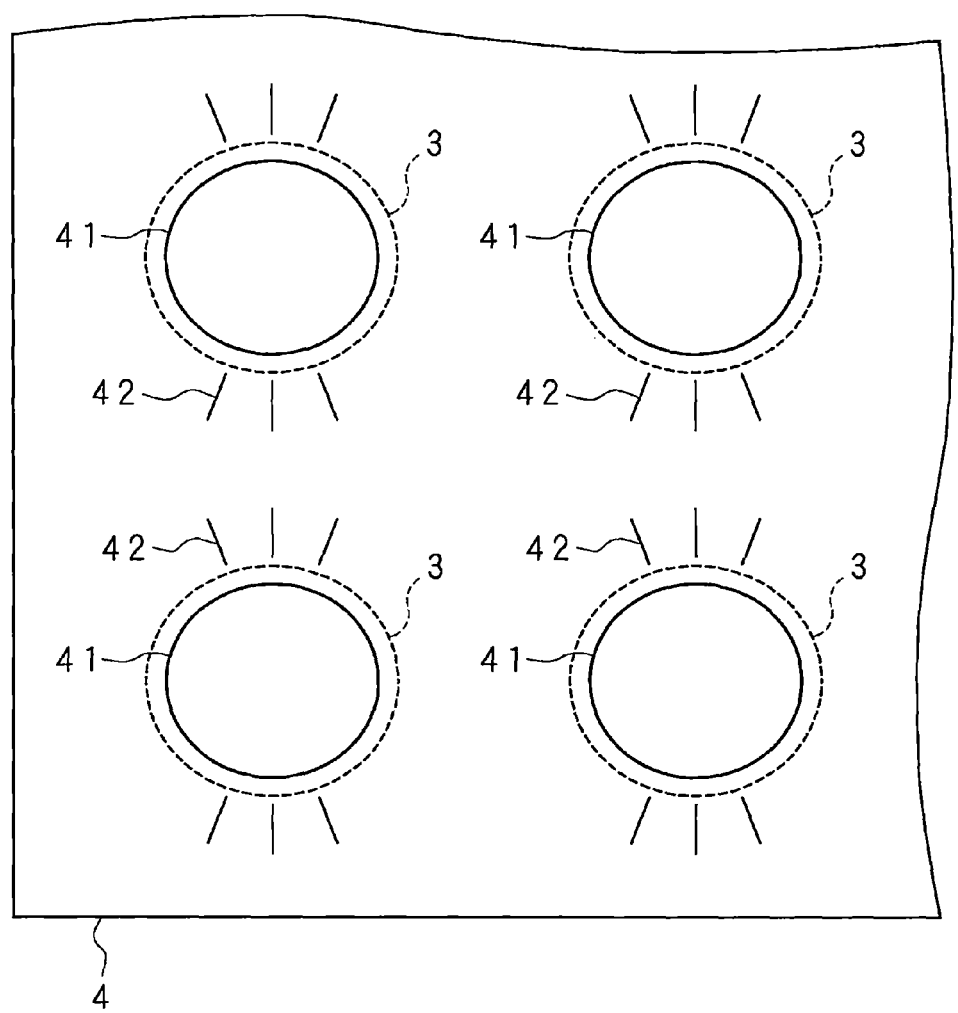
FIG. 7 is a schematic view partially illustrating a reflection sheet in a television receiving apparatus according to Embodiment 2 of the present invention.

A television receiving apparatus 100 according to Embodiment 2 of the present invention has substantially the same configuration as the Embodiment 1 of the present invention, but is different therefrom in terms of the configuration of the reflection sheet 4, which will be described in detail below. FIG. 7 is a schematic view partially illustrating the reflection sheet 4 in the television receiving apparatus 100 according to Embodiment 2 of the present invention. In FIG. 7, in order to represent a positional relationship between the through holes 41 and the lenses 3, the lenses 3 are illustrated by a broken line.

Similar to Embodiment 1, the reflection sheet 4 has high reflecting properties and is made of one synthetic resin sheet formed in a substantially rectangular shape corresponding to the backlight chassis 6, and the through holes 41 is formed at the places corresponding to the respective lenses 3.

The through hole 41 has a circular shape corresponding to the shape of the lens 3 in a view along the vertical direction, and has a diameter the same as or slightly smaller than the outer edge of the lens 3. In addition, the through hole 41 is disposed so as to match the position thereof with that of the lens 3 in a view along the vertical direction.

In addition, the through hole 41 has a plurality of cut lines 42 cut in a radiation direction at edge parts of the through hole 41. The plurality of cut lines 42 are formed apart from the peripheral edge of the through hole 41 along a radial direction of the through hole 41, and the cut lines 42 are symmetrically disposed in the up-and-down direction in the drawing with respect to the through hole 41.

In the television receiving apparatus 100 according to Embodiment 2 of the present invention, since the reflection sheet 4 has the above-described configuration, it may be more easily deformed in the vicinity of the through holes 41 including the through holes 41. Accordingly, the reflection sheet 4 is pushed toward the substrate 2 by a worker, and the lens 3 passes through the through hole 41, such that an assembly work of laying the reflection sheet 4 on the one surface 2a of the substrate 2 (the plate part 61 of the backlight chassis 6) may be more easily performed.

In the television receiving apparatus 100 according to Embodiment 2 of the present invention, since the cut lines 42 are formed apart from the edge of the through hole 41, a problem which may occur in a case in which the cut lines 42 are formed from the edge of the through hole 41 may be prevented.

That is, when forming the cut lines 42 from the edge of the through hole 41, for instance, the edge part of the through hole 41 in the reflection sheet 4 are designed so as to be cut into a plurality of parts, and the respective parts may be freely deformed. Accordingly, when assembling the reflection sheet 4, a piece of an edge part of the through hole 41 of the reflection sheet 4 (hereinafter, briefly referred to as a hole edge part) may be curled up in the vertical direction, and may remain while being hooked to the lens 3. In this case, the hole edge part of such the reflection sheet 4 forms shadows, and luminance unevenness occurs.

However, in the television receiving apparatus 100 according to Embodiment 2 of the present invention, since the cut lines 42 are formed apart from the edge of the through hole 41, deformation is limited within a certain degree. That is, because of the cut lines 42, when the lens 3 passing through the through hole 41, the through hole 41 is easily deformed, but since the cut lines 42 are formed apart from the edge of the through hole 41, after the lens 3 passes through the through hole 41, the through hole 41 may be easily returned to an original shape thereof, and the above-described problems do not occur.

The same parts as those in Embodiment 1 will be denoted by the same reference numerals, and will not be described in detail.

Embodiment 3

Figure 8:
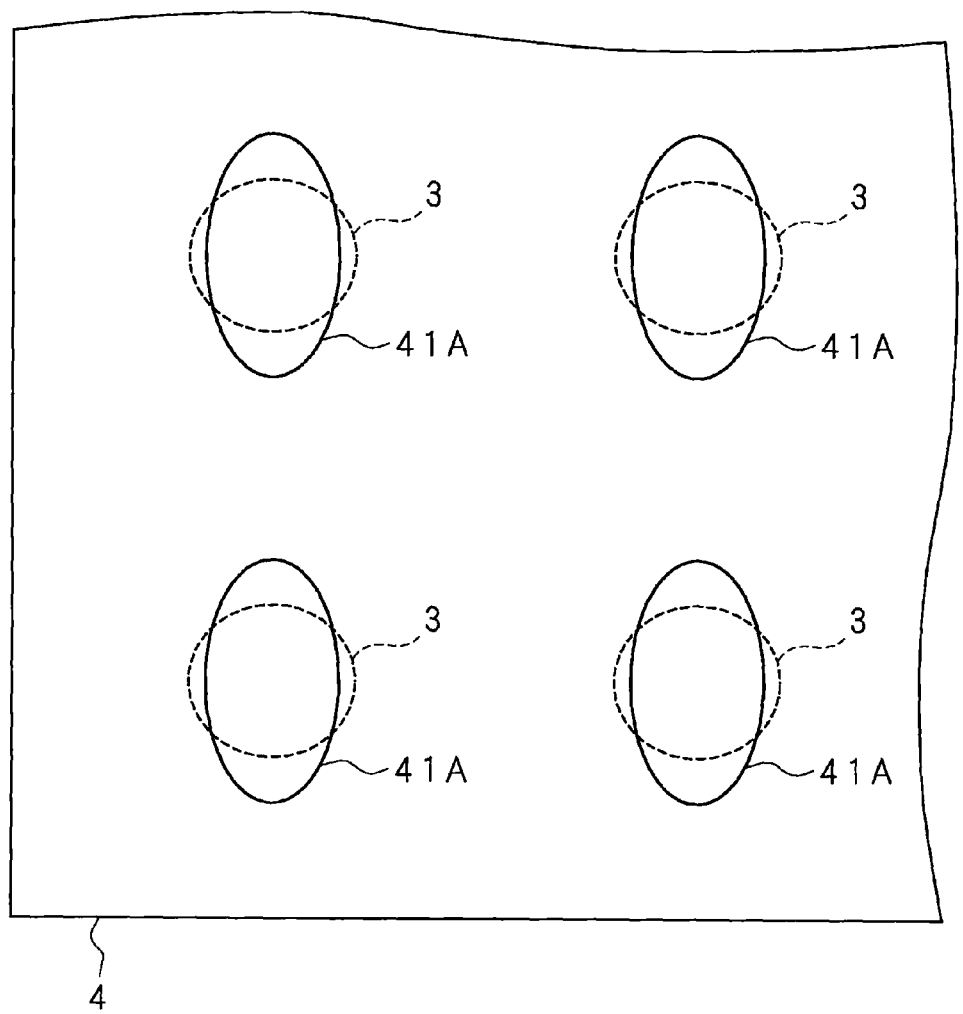
FIG. 8 is a schematic view partially illustrating a reflection sheet in a television receiving apparatus according to Embodiment 3 of the present invention.

A television receiving apparatus 100 according to Embodiment 3 of the present invention has substantially the same configuration as the Embodiment 1 of the present invention, but is different therefrom in terms of the configuration of the reflection sheet 4, which will be described in detail below. FIG. 8 is a schematic view partially illustrating the reflection sheet 4 in the television receiving apparatus 100 according to Embodiment 3 of the present invention.

Similar to Embodiment 1, the reflection sheet 4 has high reflecting properties and is made of one synthetic resin sheet formed in a substantially rectangular shape corresponding to the backlight chassis 6, and the through holes 41 is formed at the places corresponding to the respective lenses 3. In FIG. 8, in order to represent a positional relationship between the through holes 41A and the lenses 3, the lenses 3 are illustrated by a broken line.

In a view along the vertical direction, the through hole 41A is formed so as to have an elliptical shape. For example, the through hole 41A has an elliptical shape in which the up-and-down direction in the drawing is set to a long diameter thereof, and is disposed so as to match the position thereof with that of the lens 3 in a view along the vertical direction.

The through hole 41A has a larger size of a long diameter and a smaller size of a short diameter than the maximum size of the outer edge of the lens 3 in a view along the vertical direction. That is, the long diameter of the through hole 41A is larger than that of the lens 3, and the short diameter of the through hole 41A is the same as or slightly smaller than that of the lens 3.

In the television receiving apparatus 100 according to Embodiment 3 of the present invention, since the reflection sheet 4 has the above-described configuration, an interval between the edges relating to the long diameter thereof is smaller than the size of the outer edge of the lens 3 in a view along the vertical direction. Accordingly, when the reflection sheet 4 is laid, the edge part relating to the long diameter in the through hole 41A is hooked to the outer edge of the lens 3, such that floating of the reflection sheet 4 is suppressed by the lens 3. Thereby, in the television receiving apparatus 100 according to Embodiment 3 of the present invention, it is possible to prevent the reflection sheet 4 from floating by the simple configuration.

Since the reflection sheet 4 has the above-described configuration, it may be more easily deformed in the vicinity of the through holes 41A including the through holes 41A. Accordingly, an assembly work of laying the reflection sheet 4 on the one surface 2a of the substrate 2 (the plate part 61 of the backlight chassis 6) may be more easily performed.

Further, in the television receiving apparatus 100 according to Embodiment 3 of the present invention, since the short diameter of the through hole 41A is the same as or slightly smaller than the size of the lens 3, a relative movement of the lens 3 in the long diameter direction is limited. Accordingly, as compared to a case of being freely moved in the long diameter direction, it is possible to suppress (the edge part of) the through hole 41 from protruding from the outer edge of the lens 3. Thus, such a problem in which luminance unevenness occurs in the display panel 72, when a defective portion of the reflection sheet 4 in the vicinity of lens 3 is present, may be reduced as much as possible.

That is, when comparing to the through hole of the prior art having a larger diameter than that of the outer edge of the lens 3, the through hole 41A according to the present invention has characteristics as follows:

1. Long hole direction: Diameter of lens 3<Long diameter of through hole 41A≤Diameter of through hole of the prior art; and 2. Short hole direction: Short diameter of through hole 41A<Diameter of lens 3≤Diameter of through hole of the prior art.

Therefore, in the television receiving apparatus 100 according to the present invention, a positional shift between the lens 3 and the through hole 41A in a view along the vertical direction does not occur, and local luminance unevenness is more improved in the region of the long diameter of the through hole 41A according to the present invention than the region lacking the reflection sheet in the prior art by that much.

The same parts as those in Embodiment 1 will be denoted by the same reference numerals, and will not be described in detail.

Embodiment 4

Figure 9:
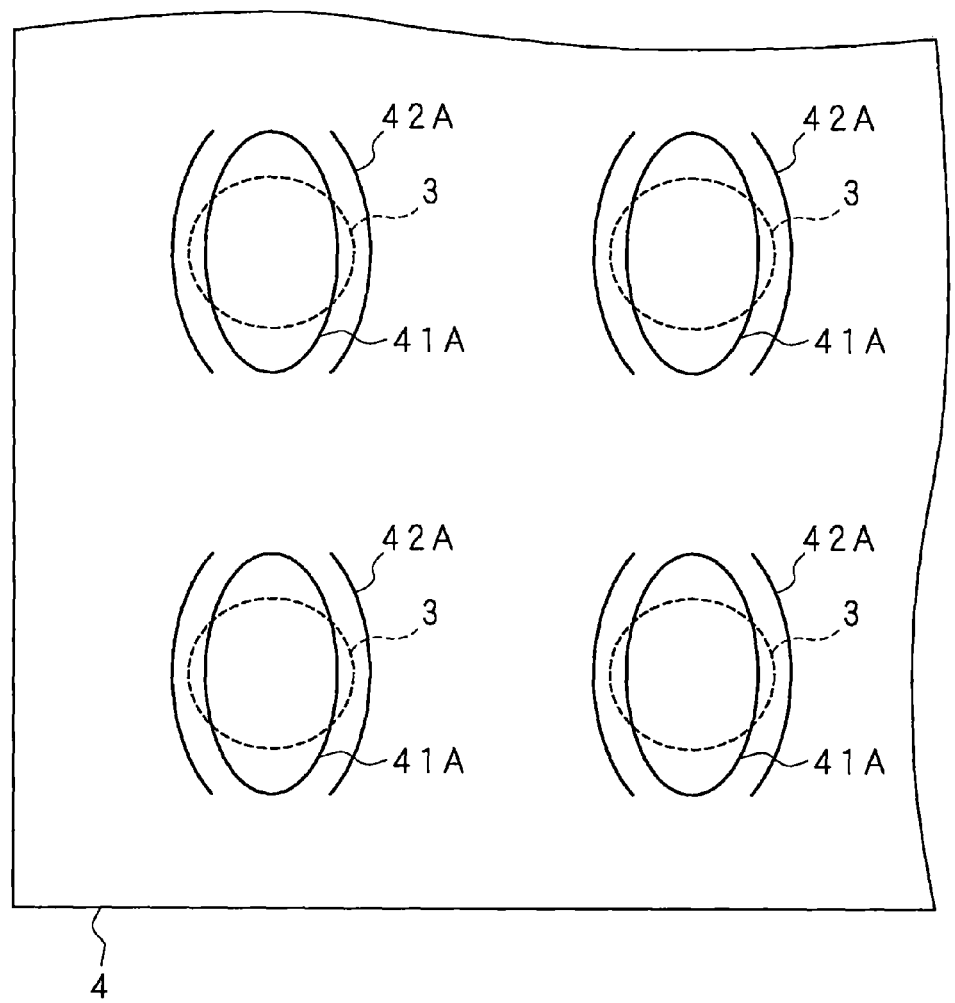
FIG. 9 is a schematic view partially illustrating a reflection sheet in a television receiving apparatus according to Embodiment 4 of the present invention.

A television receiving apparatus 100 according to Embodiment 4 of the present invention has substantially the same configuration as the Embodiment 3 of the present invention, but is different therefrom in terms of the configuration of the reflection sheet 4, which will be described in detail below. FIG. 9 is a schematic view partially illustrating the reflection sheet 4 in the television receiving apparatus 100 according to Embodiment 4 of the present invention. In FIG. 9, in order to represent a positional relationship between through holes 41A and the lenses 3, the lenses 3 are illustrated by a broken line.

Similar to Embodiment 3, the reflection sheet 4 has high reflecting properties and is made of one synthetic resin sheet formed in a substantially rectangular shape corresponding to the backlight chassis 6, and the through holes 41 is formed at the places corresponding to the respective lenses 3.

The through hole 41A has an elliptical shape in a view along the vertical direction, and is disposed so as to match the position thereof with that of the lens 3 in a view along the vertical direction.

In addition, the through hole 41A has a plurality of cut lines 42A formed at edge part of the through hole 41A along the shape thereof. More particularly, the cut lines 42A are formed apart from edge relating to a long diameter of the through hole 41A (hereinafter, referred to as long diameter edge), for example, along the shape of the long diameter edge. The cut lines 42A are respectively formed on both long diameter edge parts of the through hole 41A, and are symmetric with each other.

In addition, it is not limited to the above-described configuration, and a configuration in which the cut lines 42A are formed on edge relating to a short diameter of the through hole 41A (hereinafter, referred to as short diameter edge) apart from the short diameter edge along the shape of the short diameter edge may also be employed.

Further, it is not limited thereto, and the through hole 41A may be, for example, a circular shape rather than the elliptical shape.

In the television receiving apparatus 100 according to Embodiment 4 of the present invention, since the reflection sheet 4 has the above-described configuration, it may be more easily deformed in the vicinity of the through holes 41A including the through holes 41A. Accordingly, the reflection sheet 4 is pushed toward the substrate 2 by a worker, and the lens 3 passes through the through hole 41, such that an assembly work of laying the reflection sheet 4 on the one surface 2a of the substrate 2 (the plate part 61 of the backlight chassis 6) may be more easily performed.

The same parts as those in Embodiment 1 will be denoted by the same reference numerals, and will not be described in detail.

Embodiment 5

Figure 10:
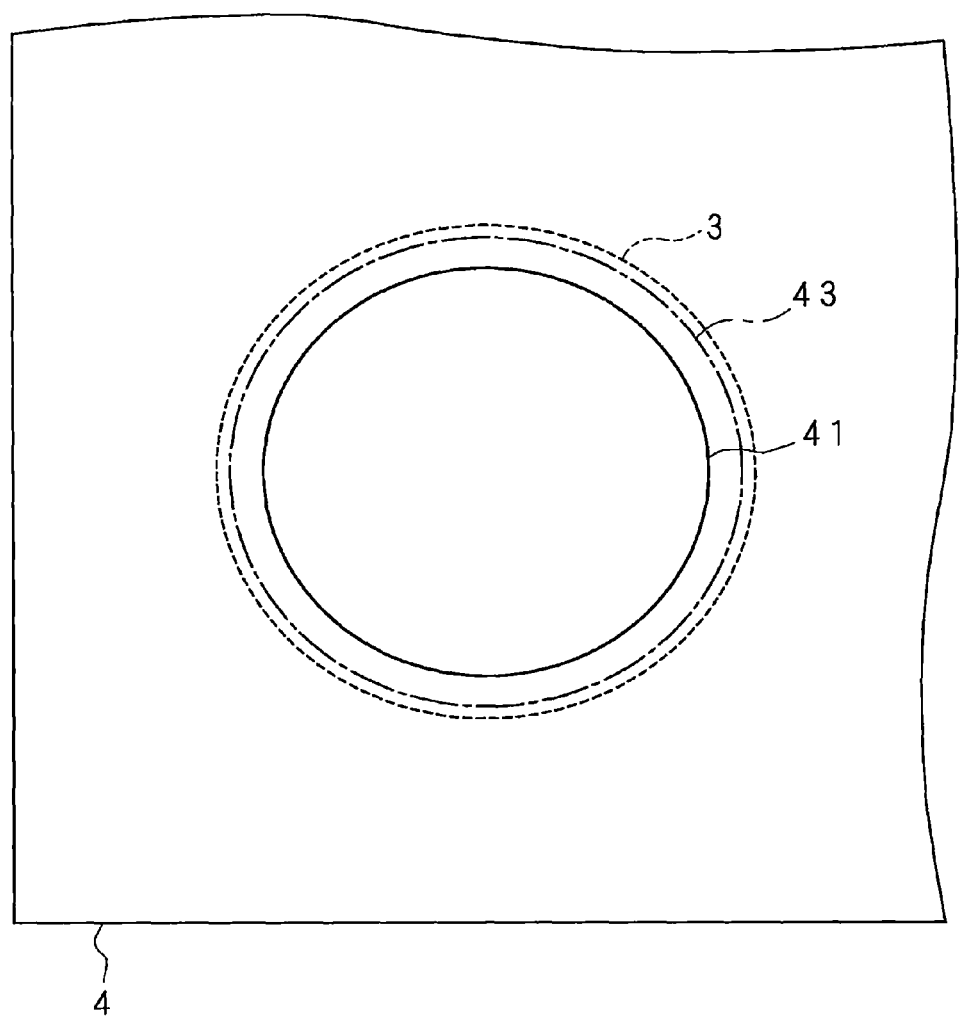
FIG. 10 is a schematic view partially illustrating a reflection sheet in a television receiving apparatus according to Embodiment 5 of the present invention.

A television receiving apparatus 100 according to Embodiment 5 of the present invention has substantially the same configuration as the Embodiment 1 of the present invention, but is different therefrom in terms of the configuration of the reflection sheet 4, which will be described in detail below. FIG. 10 is a schematic view partially illustrating the reflection sheet 4 in the television receiving apparatus 100 according to Embodiment 5 of the present invention.

Similar to Embodiment 1, the reflection sheet 4 has high reflecting properties and is made of one synthetic resin sheet formed in a substantially rectangular shape corresponding to the backlight chassis 6, and the through holes 41 is formed at the places corresponding to the respective lenses 3. In FIG. 10, in order to represent a positional relationship between the through hole 41 and the lens 3, the lens 3 is illustrated by a broken line.

In a view along the vertical direction, the through hole 41 is formed so as to have a circular shape, and is disposed so as to match the position thereof with that of the lens 3 in a view along the vertical direction.

In addition, the through hole 41 has a folding line 43 which is formed at an edge part of the through hole 41 and has a shape corresponding to the shape of the through hole 41. More particularly, the folding line 43 is formed at a position apart from the edge of the through hole 41 along the edge. For the size in a view along the vertical direction, the folding line 43 is formed in a circular shape whose diameter is slightly smaller than that of the lens 3.

In the television receiving apparatus 100 according to Embodiment 5 of the present invention, since the reflection sheet 4 has the above-described configuration, a part between the edge of the through hole 41 and the folding line 43 is easy to be deformed in a view along the vertical direction. Accordingly, it may be more easily deformed in the vicinity of the through hole 41 including the through hole 41, and an assembly work of laying the reflection sheet 4 on the one surface 2a of the substrate 2 (the plate part 61 of the backlight chassis 6) may be more easily performed by a worker.

The same parts as those in Embodiment 1 will be denoted by the same reference numerals, and will not be described in detail.

Further, the television receiving apparatus 100 according to the present invention is not limited to the above description.

Generally, an assembly of the backlight chassis 6 is performed in such a way that a part thereof such as the peripheral edge part is held by blocks etc., rather than an entire surface of the other surface (back surface) thereof is held. Therefore, a prescribed device may be installed to the other surface side of the backlight chassis 6. In addition, the backlight chassis 6 generally has a plurality of through holes formed therein.

Accordingly, when assembling the reflection sheet 4, a decompression device/a compression device may be set on the other surface side of the backlight chassis 6, and by performing an assembly work of the reflection sheet 4 with a state of operating the devices, the reflection sheet 4 is sucked to the backlight chassis 6 side, thus to more greatly facilitate a work of making the lens 3 passing through the through holes 41.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A light source comprising:
a substrate;
a reflection sheet provided on a surface of the substrate;
a plurality of light emitting elements mounted on the surface of the substrate; and
a plurality of diffusion parts which respectively cover the plurality of light emitting elements and diffuse light from the plurality of light emitting elements,
wherein
the reflection sheet has a plurality of through-holes,
in at least one direction parallel to the surface of the substrate, a distance between two edges of an opening of each of the plurality of through-holes along said direction is not more than a maximum diameter of each of the plurality of diffusion parts along said direction, and
the plurality of through-holes are formed at a position through which the plurality of diffusion parts respectively penetrate,
a plurality of cut-lines are not continuous with the opening in the reflection sheet, and
the plurality of cut-lines are formed outside each of the plurality of through-holes.

2. The light source device according to claim 1, wherein the opening has a circular shape or an elliptical shape.

3. The light source device according to claim 2, wherein around each of the plurality of through-holes, the plurality of cut-lines have a linear shape including a proximal end not continuous with the opening and a distal end furthest from the opening and are formed so as to extend radially from near the opening.

4. The light source device according to claim 2, wherein at least one cut-line is formed at a position where an edge of the opening is displaced in a predetermined direction or where is concentric with the edge of the opening.

5. The light source device according to claim 2, wherein the plurality of cut lines are formed in line symmetry with respect to each of the plurality of through-holes.

6. The light source device according to claim 2, wherein under viewing along a direction vertical to the surface of the substrate when the opening has the elliptical shape, a long diameter of the opening is larger than a maximum diameter of each of the plurality of diffusion parts, and a short diameter of the opening is smaller than the maximum diameter of each of the plurality of diffusion parts.

7. The light source device according to claim 2, wherein a folding line is formed in the reflection sheet at a position where the edge of the opening is displaced in a predetermined direction or where is concentric with the edge of the opening.

8. The light source device according to claim 1, wherein around each of the plurality of through-holes, the plurality of cut-lines have a linear shape including a proximal end not continuous with the opening and a distal end furthest from the opening and are formed so as to extend radially from near the opening.

9. The light source device according to claim 8, wherein the plurality of cut lines are formed in line symmetry with respect to each of the plurality of through holes.

10. The light source device according to claim 8, wherein under viewing along a direction vertical to the surface of the substrate when the opening has the elliptical shape, a long diameter of the opening is larger than a maximum diameter of each of the plurality of diffusion parts, and a short diameter of the opening is smaller than the maximum diameter of each of the plurality of diffusion parts.

11. The light source device according to claim 8, wherein a folding line is formed in the reflection sheet at a position where the edge of the opening is displaced in a predetermined direction or where is concentric with the edge of the opening.

12. The light source device according to claim 1, wherein at least one cut-line is formed at a position where an edge of the opening is displaced in a predetermined direction or where is concentric with the edge of the opening.

13. The light source device according to claim 12, wherein the plurality of cut lines are formed in line symmetry with respect to each of the plurality of through-holes.

14. The light source device according to claim 12, wherein under viewing along a direction vertical to the surface of the substrate when the opening has the elliptical shape, a long diameter of the opening is larger than a maximum diameter of each of the plurality of diffusion parts, and a short diameter of the opening is smaller than the maximum diameter of each of the plurality of diffusion parts.

15. The light source device according to claim 12, wherein a folding line is formed in the reflection sheet at a position where the edge of the opening is displaced in a predetermined direction or where is concentric with the edge of the opening.

16. The light source device according to claim 1, wherein the plurality of cut lines are formed in line symmetry with respect to each of the plurality of through-holes.

17. The light source device according to claim 16, wherein under viewing along a direction vertical to the surface of the substrate when the opening has the elliptical shape, a long diameter of the opening is larger than a maximum diameter of each of the plurality of diffusion parts and a short diameter of the opening is smaller than the maximum diameter of each of the plurality of diffusion parts.

18. The light source device according to claim 16, wherein a folding line is formed in the reflection sheet at a position where the edge of the opening is displaced in a predetermined direction or where is concentric with the edge of the opening.

19. The light source device according to claim 1, wherein a folding line is formed in the reflection sheet at a position where the edge of the opening is displaced in a predetermined direction or where is concentric with the edge of the opening.

20. A display apparatus comprising:
the light source device according to claim 1, and
a display panel configured to display an image using light from the light source device.

* * * * *